July 28, 1931.  H. PERROT  1,816,155

BRAKE APPLYING MEANS

Filed Aug. 12, 1927

INVENTOR
HENRI PERROT
BY
Jn. W. McConkey
ATTORNEY

Patented July 28, 1931

1,816,155

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE-APPLYING MEANS

Application filed August 12, 1927. Serial No. 212,601, and in France November 10, 1926.

This invention relates to brakes, and is illustrated as embodied in novel applying means which may be used with an internal expanding automobile brake. An object of the invention is to provide a simple applying device, preferably provided with thrust rollers to minimize friction, and which can shift to equalize the pressures on the brake shoes or their equivalents.

In one desirable arrangement there is a brake-applying shaft, shown with a crank arm to the end of which is pivoted one end of a floating lever carrying the thrust rollers. I prefer to make the lever of a pair of stampings or the like, between which the rollers are mounted.

The above and other objects and features of the invention, including various novel and desirable structural details, will be apparent from the following description of the illustrative embodiments shown in the accompanying drawing, in which:

Figure 1 is a schematic view of a brake, showing the arrangement of the applying device with respect to the shoes or equivalent friction means;

Figures 2, 3, 4, and 5 are views of various modifications of the applying means, shown in elevation;

The novel applying means is intended for operative engagement with the ends of two of the shoes 10 of the friction means of a brake, which brake may, if desired, be constructed substantially as described in Patent No. 1,567,716, granted Bendix Brake Company on December 29, 1925, on an application of A. Y. Dodge.

Figure 1:
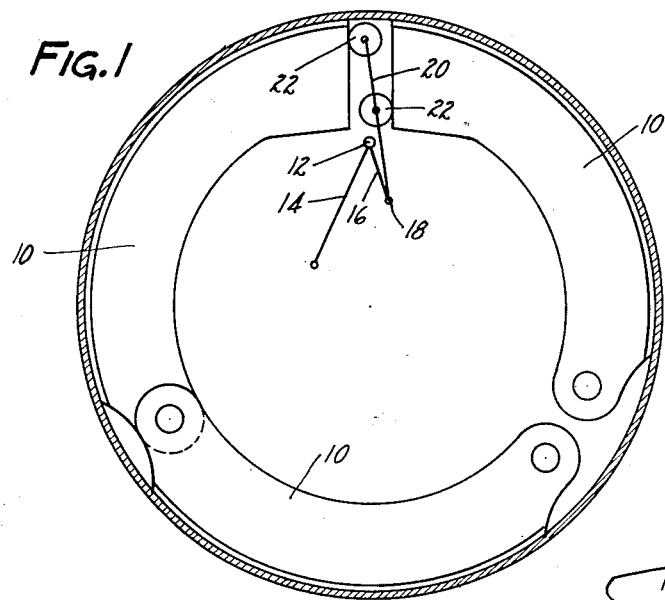
Figure 8:
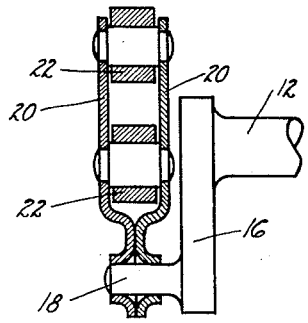
Figure 8 is a section on the line 8—8 of Figure 2, showing the mounting of the lever.

The applying device, as shown in Figures 1, 2, and 6–8, includes a brake-applying shaft 12 (which may have an operating lever indicated by the line 14 in Figure 1), provided at its end with a crank arm 16 having a pivot part or pin 18 offset from the axis of the shaft.

On part 18 there is pivoted a novel floating lever, preferably including two members such as stampings 20, between which are pivotally mounted thrust rollers 22 engaging the shoe ends.

Figure 3:
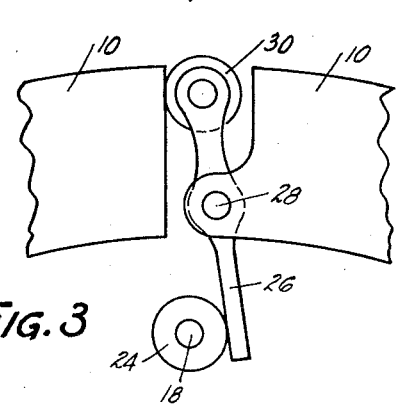

In the arrangement of Figure 3, there is a thrust roller 24, on pin 18, engaging the inner end of a floating lever 26 intermediately pivoted at 28 on the end of one shoe and having at its outer end a thrust roller 30 engaging the end of the other shoe.

Figure 4:
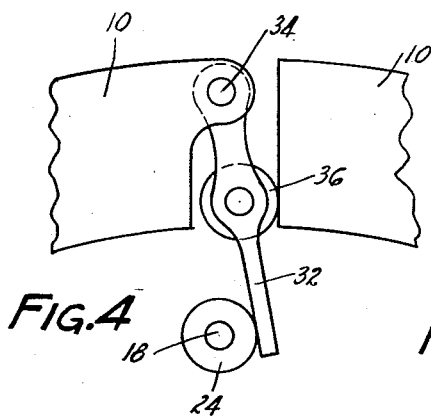
Figure 6:
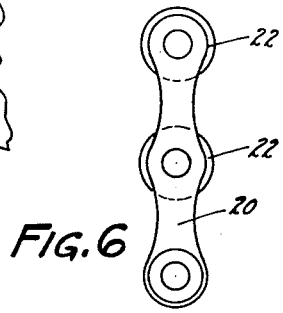
Figure 6 is a view of the novel and floating lever, with rollers, of the modification of Figure 2.
Figure 7:
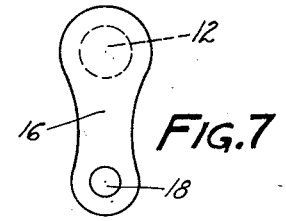
Figure 7 is an end elevation of the crank arm and shaft for operating the lever of Figure 6.

In Figure 4, the roller 24 engages the inner end of a lever 32 pivoted at its outer end at 34 to one shoe and having an intermediate thrust roller 36 engaging the other shoe.

Figure 5:
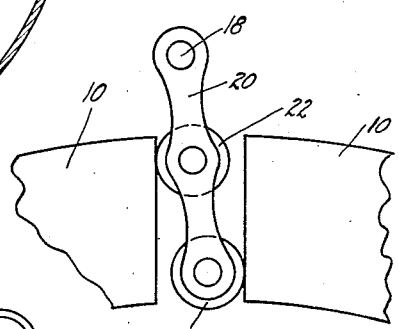
Figure 2:
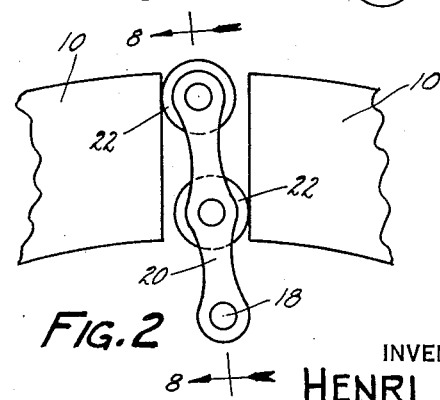

In Figure 5 the arrangement of Figure 2 is turned upside down.

While several illustrative embodiments have been described in detail, it is not my intention to limit the scope of the invention to those particular embodiments, or otherwise than by the terms of the appended claims.

I claim:

1. Applying means engageable with the friction means of a brake, comprising, in combination, a shaft, a pair of spaced members engaged by the shaft and forming a brake-applying lever operated by the shaft, and a pair of thrust rollers pivotally mounted between said members.

2. Applying means engageable with the friction means of a brake, comprising, in combination, a shaft having a crank arm, a pair of spaced members engaged at their ends by the end of the crank arm and forming a floating brake-applying lever operated by the shaft, and a pair of thrust rollers pivotally mounted between said members.

3. Applying means engageable with the friction means of a brake, comprising, in combination, a shaft, a pair of spaced members engaged by the shaft and forming a brake-applying lever operated by the shaft, and a thrust roller mounted between said members.

4. Applying means engageable with the friction means of a brake, comprising, in combination, a shaft having a crank arm, a pair of spaced members engaged at their ends by the end of the crank arm and forming a floating brake-applying lever operated by the shaft, and a thrust roller mounted between said members.

In testimony whereof, I have hereunto signed my name.

H. PERROT.